(12) United States Patent
Narramore

(10) Patent No.: US 7,878,457 B2
(45) Date of Patent: Feb. 1, 2011

(54) RETRACTABLE VORTEX GENERATOR

(75) Inventor: Jimmy Charles Narramore, Bedford, TX (US)

(73) Assignee: Bell Helicopter Textron, Inc., Hurst, TX (US)

( * ) Notice: Subject to any disclaimer, the term of this patent is extended or adjusted under 35 U.S.C. 154(b) by 308 days.

(21) Appl. No.: 11/477,806

(22) Filed: Jun. 30, 2006

(65) Prior Publication Data

US 2007/0018056 A1    Jan. 25, 2007

Related U.S. Application Data

(60) Provisional application No. 60/695,181, filed on Jun. 30, 2005.

(51) Int. Cl.
*B64C 23/06* (2006.01)
*B64C 21/00* (2006.01)

(52) U.S. Cl. .......... 244/200.1; 244/204.1; 244/99.8

(58) Field of Classification Search .......... 244/200.1, 244/199.1, 199.4, 204.1, 198, 200, 201, 204, 244/206, 213, 91, 99.12, 99.13, 99.14, 76 C, 244/3.29, 113, 130
See application file for complete search history.

(56) References Cited

U.S. PATENT DOCUMENTS

| | | | |
|---|---|---|---|
| 1,763,257 A * | 6/1930 | Roscoe .......... 244/91 |
| 2,764,373 A | 9/1956 | Anderson et al. |
| 2,959,377 A * | 11/1960 | Kaplan .......... 244/198 |
| 3,090,580 A * | 5/1963 | Kehlet et al. .......... 244/113 |
| 4,017,041 A * | 4/1977 | Nelson .......... 244/198 |
| 4,039,161 A | 8/1977 | Bauer |
| 4,444,367 A * | 4/1984 | Spillman .......... 244/199.1 |
| 4,466,586 A | 8/1984 | Burnham |
| 4,613,097 A * | 9/1986 | Jordan .......... 244/56 |
| 4,739,957 A * | 4/1988 | Vess et al. .......... 244/199.1 |
| 4,932,610 A | 6/1990 | Maestrello |
| 5,062,595 A * | 11/1991 | Maxworthy .......... 244/213 |
| 5,094,412 A | 3/1992 | Narramore |
| 5,209,438 A | 5/1993 | Wygnanski |
| 5,253,828 A | 10/1993 | Cox |
| 5,598,990 A * | 2/1997 | Farokhi et al. .......... 244/200.1 |
| 5,634,613 A | 6/1997 | McCarthy |
| 5,697,468 A * | 12/1997 | Russell et al. .......... 244/213 |
| 5,755,408 A | 5/1998 | Schmidt et al. |
| 5,785,282 A | 7/1998 | Wake et al. |
| 5,788,191 A * | 8/1998 | Wake et al. .......... 244/199.2 |
| 6,065,934 A * | 5/2000 | Jacot et al. .......... 244/99.8 |
| 6,095,459 A * | 8/2000 | Codina .......... 244/213 |

(Continued)

*Primary Examiner*—Tien Dinh
*Assistant Examiner*—Richard R Green
(74) *Attorney, Agent, or Firm*—Pillsbury Winthrop Shaw Pittman LLP

(57) ABSTRACT

A flow control device is disclosed including a flow control surface over which fluid is designed to flow in a predetermined direction. Vortex generators are associated with the flow control surface. Each respective vortex generator has a pivot axis that forms an acute angle with respect to the predetermined direction and is capable of being positioned in both of an extended state, in which the respective vortex generators function to create a swirling fluid flow, and a retracted state, in which the respective vortex generators are pivoted via the pivot axis so as to lie adjacent to the flow control surface. An actuator is associated with each of the vortex generators, each actuator adapted to position the associated vortex generator between the extended and retracted states. The flow control device is disclosed to be used in tiltrotor vehicles.

13 Claims, 5 Drawing Sheets

U.S. PATENT DOCUMENTS

| | | |
|---|---|---|
| 6,105,904 A | 8/2000 | Lisy et al. |
| 6,161,800 A * | 12/2000 | Liu et al. .................... 244/7 R |
| 6,168,111 B1 * | 1/2001 | Kayser et al. .............. 244/3.29 |
| 6,220,550 B1 | 4/2001 | McKillip, Jr. |
| 6,427,948 B1 * | 8/2002 | Campbell ................ 244/204.1 |
| 6,478,541 B1 | 11/2002 | Charles et al. |
| 6,644,588 B2 | 11/2003 | King et al. |
| 6,892,982 B2 * | 5/2005 | Clark .......................... 244/36 |
| 2004/0129838 A1 | 7/2004 | Lisy et al. |

* cited by examiner

RETRACTABLE VORTEX GENERATOR

The present application claims priority to U.S. Provisional Application Ser. No. 60/695,181, filed Jun. 30, 2005, the entirety of which is incorporated herein by reference.

BACKGROUND OF THE INVENTION

1. Field of the Invention

This invention relates to flow control surfaces with retractable vortex generators.

2. Description of Related Art

Vortex generators have been used with a variety of flow control surfaces to mix low momentum fluid flow associated with a boundary air layer of the flow control surface with a high momentum fluid flow outside of the boundary air layer. The use of such vortex generators in a variety of aircraft have produced improvements in maneuver effectiveness. However, permanently installed wing vortex generators produce drag penalties and may accrete foreign matter such as ice shapes that significantly degrade the proper performance of the aircraft.

Retractable vortex generators have been developed to compensate for these problems.

Bauer U.S. Pat. No. 4,039,161, Cox U.S. Pat. No. 5,253,828, and Lisy et al. U.S. Pat. No. 6,105,904 each disclose vortex generators which may be retracted into a flow control surface. However, the retractable vortex generators described in these documents require modification of the structure on which it is disposed to allow for internal space into which the vortex generator may be retracted when not in use. This requirement for adequate space to accommodate the vortex generators may influence the design of the wing or other structure in a negative manner. This also requires that a wing, or other such structure having a flow control surface to which a vortex generator is desired to be added cannot be easily retrofitted for such vortex generators.

Campbell U.S. Pat. No. 6,427,948, discloses a vortex generator which is capable of being selectively moved into a deflected position to produce downstream turbulence and moved into an undeflected position to reduce drag. The vortex generator of Campbell is formed of a shape memory alloy that is in the deflected position when no electric signal is applied to an associated heater and is in the undeflected position when an electric signal is applied to the associated heater. However in both the deflected and undeflected states the vortex generator protrudes outside of the flow control surface and, while the undeflected state may produce less drag in comparison with the deflected state, the protrusion will still produce some undesirable residual drag and does not alleviate the problem of ice accretion on the exposed vortex generators.

BRIEF SUMMARY OF THE INVENTION

The present invention provides a flow control device including a flow control surface over which fluid is designed to flow in a predetermined direction. Vortex generators are associated with the flow control surface. Each respective vortex generator has a pivot axis that forms an acute angle with respect to the predetermined direction and is capable of being positioned in both of an extended state, in which the respective vortex generators function to create a swirling fluid flow, and a retracted state, in which the respective vortex generators are pivoted via the pivot axis so as to lie adjacent to the flow control surface. An actuator is associated with each of the vortex generators, each actuator is adapted to position the associated vortex generator between the extended and retracted states.

In one embodiment, the acute angle that the vortex generators make with the predetermined direction is between 5 to 45 degrees when in the extended state.

In one example, the actuator may be a heater that actuates a shape memory material made from a nickel-titanium alloy. However other types of electromechanical actuators may also be used.

In one example, the vortex generator may be in the form of a fin that is parallel to the flow control surface when in the retracted state and set at an angle between 0 and 180 degrees when in the extended state.

The flow control device as described provides reduction of drag and ice accumulation on flow control surfaces without requiring space in the flow control device to be reserved for the retracted vortex generators. Thus the retractable vortex generators of the current invention may be applied to a large variety of flow control surfaces without the necessity of extensive retrofitting of the flow control surfaces.

DETAILED DESCRIPTION OF THE INVENTION

Figure 1A:
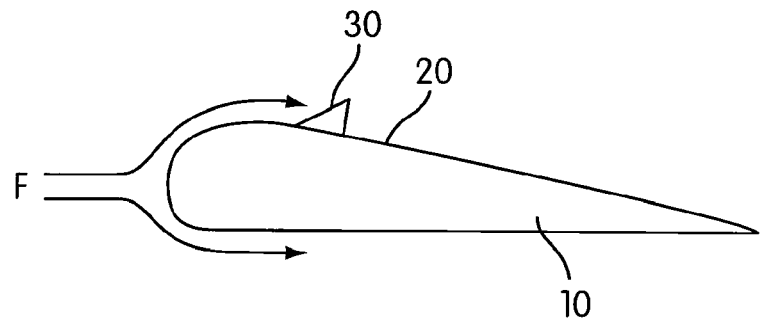
FIG. 1A is a side view of a flow control device having a vortex generator in an extended or deployed state in accordance with the present invention.
Figure 1B:
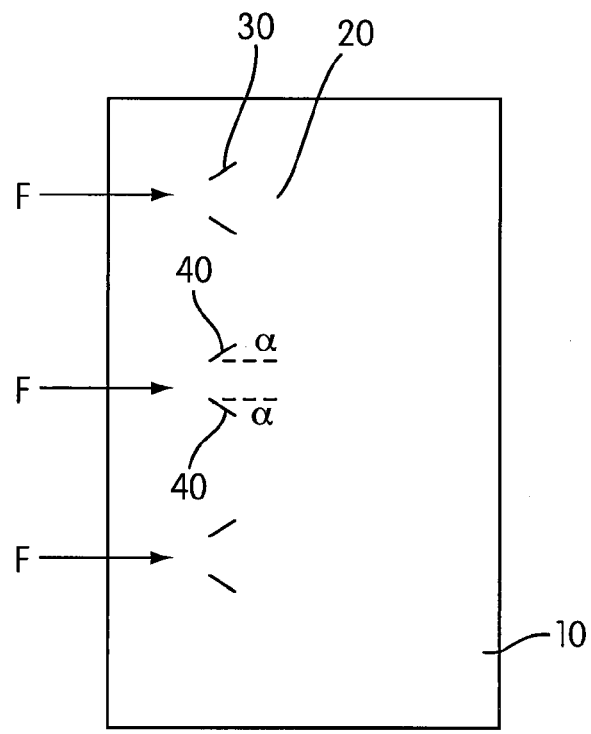
FIG. 1B is a top view of a flow control device having a vortex generator in an extended or deployed state in accordance with the present invention.
Figure 2A:
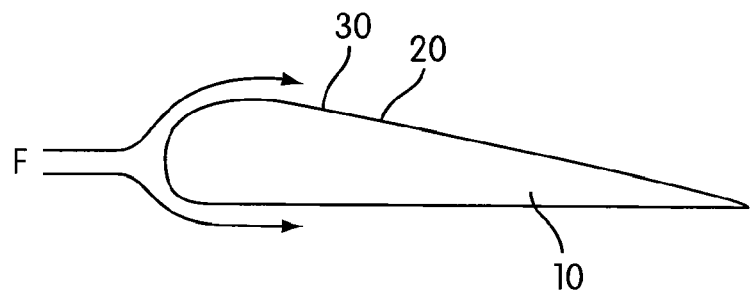
FIG. 2A is a side view of a flow control device having a vortex generator in a retracted state in accordance with the present invention.
Figure 2B:
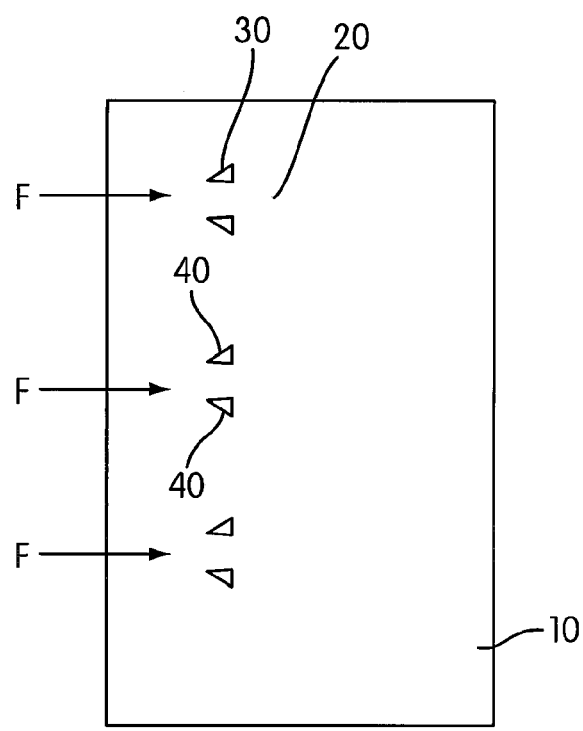
FIG. 2B is a top view of a flow control device having a vortex generator in a retracted state in accordance with the present invention.

FIGS. 1A, 1B, 2A, and 2B show an example of a flow control device 10 in accordance with one embodiment of the present invention. FIG. 1A shows a side view and FIG. 1B shows a top view of a flow control surface 20 over which a fluid media is designed to flow in a direction represented by vector F. An array of vortex generators 30 are illustrated in an extended position. Vortex generators 30 are substantially flat structures that are generally perpendicular with respect to the plane of the control surface when extended. Each of the vortex generators 30 are constructed so as to be pivotable about a pivot axis 40. The pivot axis 40 forms an acute angle α with the flow direction (or primary wind direction) F so as to facilitate the generation of a swirling fluid flow. The acute angle α may be between 5 and 45 degrees (or −5 to −45 degrees, depending on the direction measured) to generate vortices over the flow control surface 20. In a more specific embodiment, the angle α is between 12 and 25 degrees, and even more specifically between 19 and 21 degrees. FIGS. 2A and 2B show a side view and a top view of a flow control surface 20 over which a fluid media is designed to flow in the predetermined direction F when an array of vortex generators 30 are in a retracted position. As shown the vortex generators have pivoted about pivot axis 40 so as to lie in generally parallel, overlying relation with the upper flow control surface 20. In one embodiment, the retracted vortex generators lie in abutting contact with the upper flow control surface 20. In this state the vortex generators are out of the way of the flow thus substantially eliminating drag effects from the vortex generators. Thus the vortex generators are extended when needed and retracted at all other flight conditions without requiring any space in the flow control device for storing the vortex generator when not in use. In the illustrated embodiments, surface 20 has a substantially continuous, unmodified shape. It can be appreciated, therefore, that the vortex generators as illustrated in the figures herein can be retrofitted onto many different types of previously manufactured surfaces 20. In another embodiment (not shown), the upper surface area on which the vortex generator is disposed when deployed is slightly recessed. Such a recess may have a depth that is of the same dimension as the thickness of the vortex generator, so that the vortex generator's exposed surface when retracted is substantially flush with adjacent surface portions of surface 20.

Figure 3A:
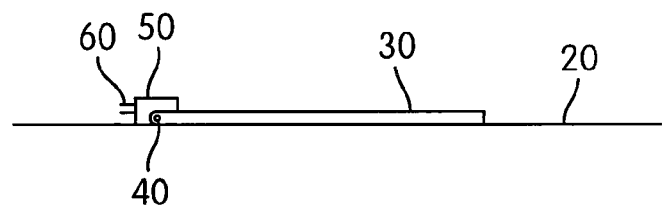
FIG. 3A is a view along a pivot axis of a respective vortex generator when in the retracted state in accordance with one embodiment of the present invention.
Figure 3B:
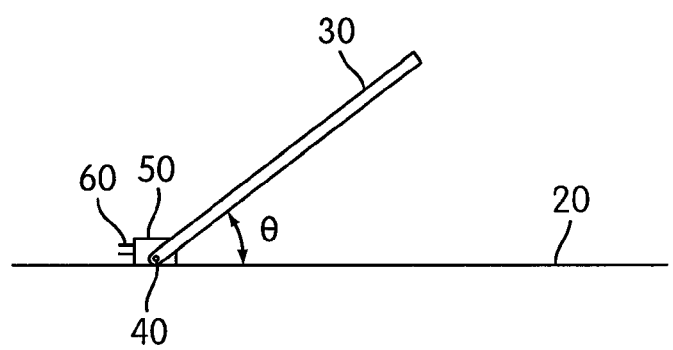
FIG. 3B is a view along a pivot axis of the vortex generator of FIG. 3A when in an extended or deployed state.

FIGS. 3A and 3B show an example of the operation of a vortex generator 30 on the flow control surface 20 in accordance with one embodiment of the invention. FIG. 3A is a view taken in a direction along the pivot axis 40 of the vortex generator 30 when it is in the retracted state. FIG. 3B is a view along to the pivot axis 40 of the vortex generator 30 when it is in extended state. The vortex generator is actuated by a motor or actuator 50 so as to be repositioned between the retracted and extended state. The extended state may be variably chosen so that the vortex generator is inclined at an angle θ with respect to the flow control surface 20. In the current embodiment the actuator 50 may be an electromagnetic motor controlled by electrical input 60 (from an external controller) and the angle θ may be adjusted to lie between 0 and 180 degrees relative to surface 20. In one embodiment the angle θ is deployed at an orientation or angle θ that is normal (90°) to surface 20. In another embodiment, the vortex 30 is deployed at an angle of −4° to +4° relative to normal.

Figure 4A:
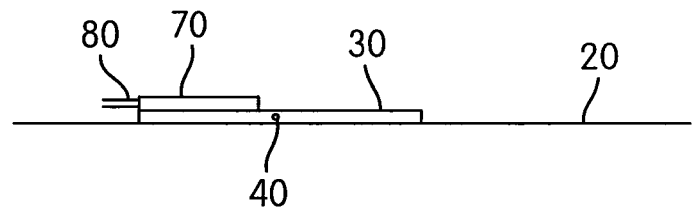
FIG. 4A is a view along a pivot axis of a respective vortex generator when in the retracted state in accordance with another embodiment of the present invention.
Figure 4B:
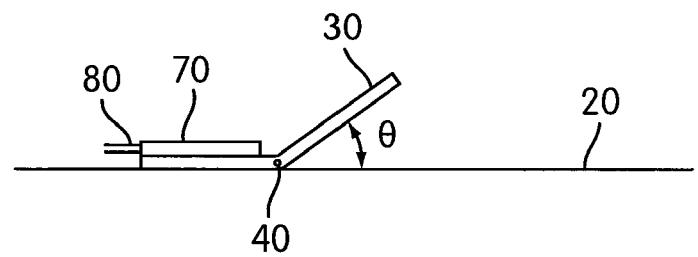
FIG. 4B is a view along a pivot axis of the vortex generator of FIG. 4A when in an extended or deployed state.

FIGS. 4A and 4B show an example of another actuator for positioning the vortex generator 30 between the extended and retracted position. In this example the actuator includes a heater 70 controlled by electrical input 80 (from an external controller). The vortex generator 30 is formed with a shape memory alloy such as nickel-titanium alloys and is initially deformed to be in the extended position as shown in FIG. 4B during manufacture. In the extended position of FIG. 4B, the vortex generator 30 forms an angle θ with respect to surface 20. The angle θ can be in the same range or ranges as that for the embodiment of FIGS. 3A and 3B as discussed above. Upon application of heat by the heater 70 above the particular transition temperature of the shape memory material, the vortex generator returns to the non-deformed state as shown in FIG. 4A. In another embodiment, the shape memory alloy vortex generator is initially in a retracted (non-deployed) position as illustrated in FIG. 4A. When heat is applied to the shape memory alloy vortex generator it moves from its retracted position of FIG. 4A to the deployed position of FIG. 4B.

A variety of types of actuators may be used to perform the pivoting function as described as evident to a person of ordinary skill in the art. For example thermal bimorph actuators, piezoelectric bimorph actuators as well as any other actuators capable of creating a pivoting action may be employed as the actuators of the present invention.

Figure 5:
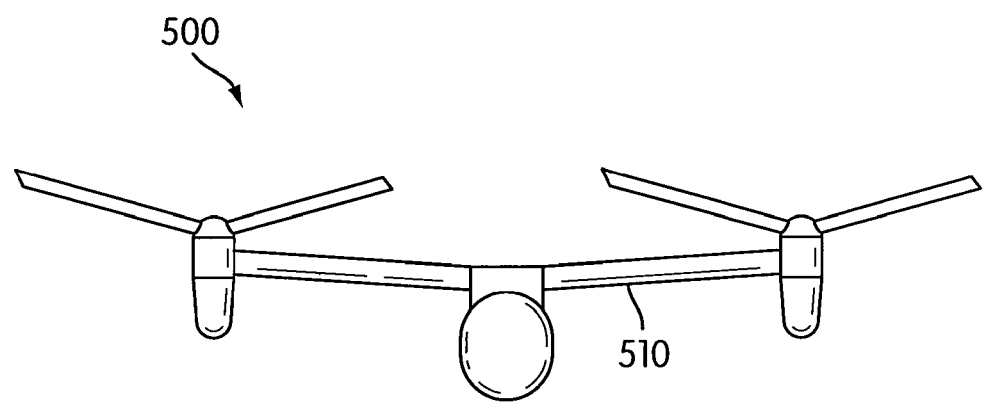
FIG. 5 shows a tiltror aircraft 500 including a tiltrotor wing 510.

In one embodiment, the flow control device of the present invention is employed as part of a wing of a tiltrotor aircraft. FIG. 5 shows a tiltrotor aircraft 500 including a tiltrotor wing 510.

Although a particular configuration of the vortex generators has been shown, the present invention is not limited to this configuration and a variety of other arrangements may be used in creating co-rotating as well as counter-rotating effects.

Although the shape of the individual vortex generators has been shown as triangular, the present invention is not limited to this shape and other shapes of the vortex generator such as rectangular shapes or other shapes may be used.

While a particular embodiment of the present invention has been shown and described, it will be apparent to those skilled in the art that a variety of modifications may be made without departing from the teachings of the present invention.

What is claimed is:

1. A flow control device comprising:
vortex generators associated with a flow control surface of an aircraft over which fluid is designed to flow in a predetermined direction, each respective vortex generator having a pivot axis that forms an acute angle with respect to the predetermined direction and capable of being positioned in both of an extended state, in which the respective vortex generators function to create a swirling fluid flow, and a retracted state, in which the respective vortex generators are pivoted via the pivot axis so as to lie generally parallel to, and overlying and protruding from the flow control surface; and
an actuator associated with each of the respective vortex generators, each actuator adapted to position the associated vortex generator reversibly between the extended and retracted states,
wherein each of the respective vortex generators comprises a shape memory material, and wherein the actuator includes a heater configured to actuate the shape memory material from the retracted state to the extended state,
wherein the vortex generators are spaced from a leading edge of the flow control surface.

2. A flow control device according to claim 1, wherein the acute angle is from 5 to 45 degrees.

3. A flow control device according to claim 1, wherein each of the respective vortex generators is in the form of a fin that lies parallel to the flow control surface when in the retracted state and is set at an angle greater than 0 degrees and less than 180 degrees with respect to the flow control surface when in the extended state.

4. A flow control device according to claim 1, wherein the flow control surface is part of a tiltrotor vehicle.

5. A flow control device according to claim 1, wherein a surface of said vortex generator exposed to the fluid flow in the retracted state protrudes from said flow control surface when the control surface is exposed to the fluid flow.

6. A flow control device according to claim 1, wherein each actuator is configured to deploy the associated vortex generator from the retracted state into the extended state and to retract the associated vortex generator from the extended state into the retracted state.

7. A flow control device according to claim 1, wherein the vortex generators are positioned in a staggered fashion on the flow control surface such that pivot axes of two consecutive vortex generators form an angle.

8. A flow control device according to claim 1, wherein the vortex generators are disposed on the flow control surface and within a perimeter of the flow control surface.

9. A tiltrotor aircraft comprising:
   a tiltrotor wing having a flow control surface over which fluid is designed to flow in a predetermined direction;
   vortex generators associated with the flow control surface, each respective vortex generator having a pivot axis that forms an acute angle with respect to the predetermined direction and capable of being positioned in both of an extended state, in which the respective vortex generators function to create a swirling fluid flow, and a retracted state, in which the respective vortex generators are pivoted via the pivot axis so as to lie generally parallel to, and overlying and protruding from the flow control surface; and
   an actuator associated with each of the respective vortex generators, each actuator adapted to position the associated vortex generator reversibly between the extended and retracted states,
   wherein each of the respective vortex generators comprises a shape memory material, and wherein the actuator includes a heater configured to actuate the shape memory material from the retracted state to the extended state wherein the vortex generators are spaced from a leading edge of the flow control surface.

10. A tiltrotor aircraft according to claim 9, wherein the acute angle is from 5 to 45 degrees.

11. A tiltrotor aircraft according to claim 9, wherein each of the respective vortex generators is in the form of a fin that lies parallel to the flow control surface when in the retracted state and is set at an angle greater than 0 degrees and less than 180 degrees with respect to the flow control surface when in the extended state.

12. A tiltrotor aircraft according to claim 9, wherein a surface of said vortex generator exposed to the fluid flow in the retracted state protrudes from said flow control surface when the control surface is exposed to the fluid flow.

13. A tiltrotor aircraft according to claim 9, wherein the vortex generators are disposed on the flow control surface and within a perimeter of the flow control surface.

\* \* \* \* \*